3,476,164
EXPANDING BODY FOR ANCHORING BOLTS, NUTS OR SIMILAR CONNECTING ELEMENTS IN STRUCTURAL MEMBERS

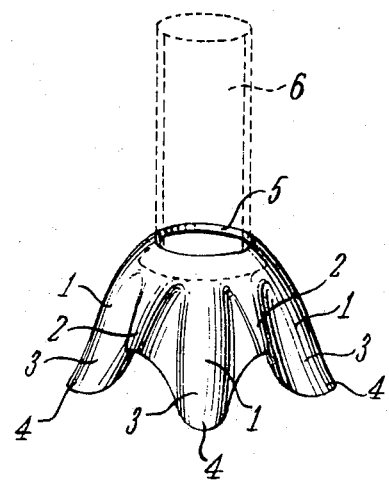

Hans G. Voullaire, 7751 Dingelsdorf, Seemuhle, Germany
Filed Nov. 18, 1966, Ser. No. 595,503
Claims priority, application Germany, Nov. 25, 1965,
V 29,797
Int. Cl. F16b *39/00, 1/00*
U.S. Cl. 151—41.74                          3 Claims

ABSTRACT OF THE DISCLOSURE

A substantially cone-shaped hollow body for anchoring bolts, nuts, and the like, in a structural member such as wood, plywood, hardwood, chipboard, and the like, the tapered surface of said body being formed in a plurality of outwardly convex corrugated sections whose apices are each in a common plane with the axis of the body. Some of said corrugations terminate in tips which are slightly outwardly bent and other intermediate ones of said corrugations are shorter and less convex. The body is such that it may be pressed or hammered directly into the surface of the structural member without the need for a pre-drilled hole into which the body must be inserted.

---

This invention relates to an expanding body for anchoring bolts, nuts or similar connecting elements in structural members made of wood, plywood, hardboard, chipboard or the like with a substantially cone-shaped hollow body open on one side, adapted to be flattened for anchoring and placed, within the area of its tapered surface, over a shaft extending in parallel to the longitudinal axis of the hollow body.

Expanding bodies of this type that have been proposed are only adapted to anchor connecting elements such as bolts or the like in blind holes previously drilled in the structural members. The invention has for its object to avoid the additional operation of drilling the blind holes and to shape the expanding body so that it can be hammered or pressed directly into the structural member.

According to the invention, this problem is solved by having the tapered surface of the hollow body in the area of at least a few outwardly convex corrugated sections terminate in tips adapted to be directly pressed or hammered into the structural member. The use of the expanding bodies according to the invention considerably reduces the amount of work required in anchoring bolts, nuts or similar connecting elements without affecting the strength of the connection obtained with the aid of the hollow body.

If a substantial expansion of the body according to the invention is to be obtained, the angle included between the apices of the corrugated sections and the longitudinal axis of the expanding body must not be too small. Conversely, penetration of the tips into the structural member becomes easier if the tips form as steep an angle as possible with the structural member. Moreover, the possibility of radial expansion of the expanding body is the greater, the smaller the apex angle of the cone on which the apices of the corrugations are located. These requirements, which in themselves are contradictory, can be taken into consideration according to the invention by slight outward bending of the tip end. This makes it possible to employ a relatively small apex angle in the expanding body, while at the same time the forces acting on the outwardly bent tips of the expanding body being driven home ensure good expansion of that body.

In a preferred embodiment of the invention, the tip extensions of the corrugated sections are more convex than intermediate corrugated sections. This ensures that when the body is being expanded, the corrugated sections intermediate the tips are substantially flattened so that at these points, with the body expanded, pressure webs are formed which make pulling out of the expanded body by restoring the same to its original shape practically impossible. On the other hand, those corrugated sections which have been extended to form tips partly maintain their convex shape so that the claws thereby formed have a higher flexural stiffness. As a result, the expanded body according to the invention becomes so strong that if pulling out of the connecting element thereby anchored were to be feared, this would be due rather to yielding of the material of the structural member than to deformation of the claw.

In the expanding body according to the invention, a short, slightly convex corrugated section is conveniently arranged between each two corrugated sections extended to form tips, it being possible to distribute evenly over the circumference of the hollow body three or four such tips.

The drawing shows a perspective view of an expanding body embodying the invention. Said expanding body forms a hollow body made of steel sheet, open on one side, and whose substantially cone-shaped outer surface is formed with corrugations 1 and 2 whose apices are each located in a common plane with the axis of the hollow body. The corrugations 1 are more convex outwardly than the corrugations 2 and end in tips 3 adapted to be pressed or hammered directly into a structural member. Said tips as indicated at 4 are slightly outwardly bent. On the side opposite the tips, the expanding body has an opening 5 through which the shaft of the connecting element, for example, a bolt 6 shown in dashed lines, can extend.

To secure a connecting element to a structural member not shown in detail, and which may for example be of wood, plywood, hardboard, chipboard or the like, the connecting element to be secured is first introduced into the hollow expanding body from the open end thereof and pushed with its shaft through the hole 5 of the expanding body. Next the expanding body is placed on the structural member and pressed or hammered into the same with a hollow tool receiving the shaft of the connecting element. When this is done, the tips 3 of the more-convex corrugation 1 penetrate into the structural member and in doing so are simultaneously expanded because of their angular position. This expanding movement is enhanced considerably by the outwardly bent ends 4 of the tips 3. When driving the expanding body into the structural member, the less-convex corrugations 2 also enter the material of the structural member and are substantially flattened by the expanding corrugations 1. The latter, however, because of their greater convexity retain a certain residual convexity which imparts high stiffness to these claw-like corrugations. On the other hand, the substantially flattened, less-convex corrugations 2 form pressure bodies arranged between said claws to prevent any pull exerted on the expanded body from causing the corrugations 1 to reapproach each other and reassume their original cone shape. In this manner, a very dependable and solid anchorage of the connecting element is obtained.

Because of this interaction between the corrugations extended to form tips and the interposed, shorter corrugations it is also particularly advantageous to dispose only one, somewhat less-convex corrugation between each two tips, although other arrangements may be imagined. Likewise, it would be possible to provide more or less than four corrugations extended to form tips, the number of tips being dependent not only on the size of the expanding body but also on the material of the structural member to which the expanding body is to be secured.

The expanding bodies according to the invention are preferably formed of steel sheet plates which, prior to forming, are provided with a center hole forming the opening 5 and with an outline enabling the desired tips and shorter corrugations to be obtained upon forming.

It is to be understood that the invention is not limited to the embodiment shown but that modifications are possible without departing from the scope of the invention. Thus, it is possible not only to select the material for forming the expanding body to suit the requirements envisaged, but also to vary within wide limits the shape and number of corrugations and tips. Moreover, it is possible not only to use the expanding bodies according to the invention to secure specific connecting elements to structural members but also to provide such expanding bodies themselves directly with the connecting elements, as for instance with rivet or bolt pins and with thread sections serving as nuts. If for instance, a suitable thickness of material is used, the opening 5 could itself carry a thread and serves as a nut. Modifications of the embodiment shown can then employ individual features of the invention separately or several thereof in any desired combination.

What I claim is:

1. An expanding body for anchoring elements in structural members, said expanding body comprising
    a substantially cone shaped hollow body open on one side and adapted to be flattened for anchoring, the tapered surface of said body having
    a plurality of first corrugations which are outwardly convex and the apices of which are each in a common plane with the axis of said hollow body, said first corrugations terminating in tips adapted to be pressed directly into the surface of said structural member; and
    a plurality of second corrugations which are outwardly convex and the apices of which are in a common plane with the axis of said hollow body, said second corrugations being disposed intermediate said first corrugations and each of said second corrugations being shorter and less convex than said first corrugations.

2. An expanding body in accordance with claim 1 wherein the ends of said tips are slightly outwardly bent.

3. An expanding body in accordance with claim 1 wherein at least three of said first corrugations are evenly distributed over the circumference of said hollow body.

References Cited

UNITED STATES PATENTS

| | | | |
|---|---|---|---|
| 1,998,251 | 4/1935 | Pool | 85—49 |
| 1,897,253 | 2/1933 | Gaubert et al. | 151—41.74 |
| 3,137,505 | 6/1964 | Coppola | 151—41.74 |
| 3,199,397 | 8/1965 | Borsody | 151—41.74 |

FOREIGN PATENTS

| | | |
|---|---|---|
| 1,835,853 | 7/1963 | France. |
| 839,550 | 5/1952 | Germany. |
| 7,456 | 11/1905 | Great Britain. |
| 743,651 | 1/1956 | Great Brtain. |

MARION PARSONS, Jr., Primary Examiner